US007883018B2

(12) United States Patent
Riley et al.

(10) Patent No.: US 7,883,018 B2
(45) Date of Patent: Feb. 8, 2011

(54) METHOD FOR MAKING AND A BUSINESS FORM HAVING PRINTED BAR CODES ON A COATED SUBSTRATE

(75) Inventors: James M. Riley, Saint Louis, MO (US); Sanjay K. Jain, Saint Louis, MO (US); Mark Greer, O'Fallon, MO (US)

(73) Assignee: Laser Band, LLC, St. Louis, MO (US)

( * ) Notice: Subject to any disclaimer, the term of this patent is extended or adjusted under 35 U.S.C. 154(b) by 1012 days.

(21) Appl. No.: 11/455,131

(22) Filed: Jun. 15, 2006

(65) Prior Publication Data

US 2007/0257118 A1 Nov. 8, 2007

Related U.S. Application Data

(60) Provisional application No. 60/798,605, filed on May 8, 2006.

(51) Int. Cl.
G06K 19/06 (2006.01)
G06K 19/00 (2006.01)
G06K 19/02 (2006.01)

(52) U.S. Cl. .................. 235/491; 235/487; 235/488; 235/494

(58) Field of Classification Search .......... 235/487, 235/488, 491, 494
See application file for complete search history.

(56) References Cited

U.S. PATENT DOCUMENTS

| 230,455 | A | 7/1880 | Wilcox |
| 919,983 | A | 4/1909 | Walsh |
| 922,948 | A | 5/1909 | Portmore |
| 1,383,335 | A | 7/1921 | Penksa |
| 1,517,456 | A | 12/1924 | Pulliam |
| 2,054,227 | A | 9/1936 | Nichols |

(Continued)

FOREIGN PATENT DOCUMENTS

DE 202009015077 U1 1/2010

(Continued)

OTHER PUBLICATIONS

International Search Report for PCT/US2009/031979 dated Mar. 9, 2009.

(Continued)

*Primary Examiner*—Thien M. Le
*Assistant Examiner*—April A Taylor
(74) *Attorney, Agent, or Firm*—Thompson Coburn LLP

(57) ABSTRACT

A business form such as a wristband or label includes an imaging area of face stock overprinted with a fluorescent ink for receiving a printed bar code to enhance the scannability of the bar code. The ink may be applied by overprinting to a thickness of between about 0.2 to about 0.5 mils, and even more preferably to a thickness of about 0.2 mils. The overprint ink is also print receptive allowing a bar code to be printed onto it with no deleterious effects. The imaging area of the wristband form may be overlaminated and the bar code scannability will still be enhanced. An alternative embodiment comprises a face stock manufactured to have a finished surface exhibiting a fluorescent effect similar to that achieved by overprinting through mixing in appropriate components as the face stock is made.

28 Claims, 2 Drawing Sheets

U.S. PATENT DOCUMENTS

| | | |
|---|---|---|
| 2,073,280 A | 3/1937 | Lederer |
| 2,553,676 A | 5/1951 | Roos |
| 2,641,074 A | 6/1953 | Richmond |
| 2,687,978 A | 8/1954 | Vogt |
| 3,153,869 A | 10/1964 | Twentier |
| 3,197,899 A | 8/1965 | Twentier |
| 3,402,808 A | 9/1968 | Yannuzzi |
| 3,517,802 A | 6/1970 | Petrie |
| 3,585,743 A | 6/1971 | Jeffers |
| 3,660,916 A | 5/1972 | McDermott et al. |
| 3,854,229 A | 12/1974 | Morgan |
| 4,004,362 A | 1/1977 | Barbieri |
| 4,078,324 A | 3/1978 | Wiebe |
| 4,179,833 A | 12/1979 | Knodel |
| 4,226,036 A | 10/1980 | Krug |
| 4,233,715 A | 11/1980 | McDermott |
| 4,370,370 A * | 1/1983 | Iwata et al. ............... 428/41.6 |
| 4,565,731 A | 1/1986 | Komatsu et al. |
| 4,612,718 A | 9/1986 | Golub et al. |
| 4,627,994 A | 12/1986 | Welsch |
| 4,630,384 A | 12/1986 | Breen |
| 4,682,431 A | 7/1987 | Kowalchuk |
| 4,696,843 A | 9/1987 | Schmidt |
| 4,783,917 A | 11/1988 | Smith et al. |
| 4,829,604 A | 5/1989 | Allen et al. |
| 4,854,610 A | 8/1989 | Kwiatek |
| 4,855,277 A | 8/1989 | Walter |
| 4,914,843 A | 4/1990 | Dewoskin |
| 4,941,210 A | 7/1990 | Konucik |
| 4,950,638 A * | 8/1990 | Yuyama et al. ............ 503/226 |
| 4,956,931 A | 9/1990 | Selke |
| 4,978,144 A | 12/1990 | Schmidt et al. |
| 4,991,337 A | 2/1991 | Solon |
| RE33,616 E | 6/1991 | Welsch |
| 5,026,084 A | 6/1991 | Pasfield |
| 5,045,426 A | 9/1991 | Maierson et al. |
| 5,135,789 A | 8/1992 | Schmidt |
| 5,222,823 A | 6/1993 | Conforti |
| 5,227,004 A | 7/1993 | Belger |
| 5,227,209 A | 7/1993 | Garland |
| 5,283,969 A | 2/1994 | Weiss |
| 5,311,689 A | 5/1994 | Lindsey |
| 5,318,326 A | 6/1994 | Garrison |
| 5,331,140 A * | 7/1994 | Stephany ............... 235/462.06 |
| 5,351,993 A | 10/1994 | Wright |
| 5,370,420 A | 12/1994 | Khatib et al. |
| 5,381,617 A | 1/1995 | Schwartztol et al. |
| 5,383,686 A | 1/1995 | Laurash |
| 5,395,667 A | 3/1995 | Ohno et al. |
| 5,418,026 A | 5/1995 | Dronzek, Jr. et al. |
| 5,427,416 A | 6/1995 | Birch |
| 5,486,021 A | 1/1996 | Laurash |
| 5,486,436 A | 1/1996 | Lakes |
| 5,509,693 A | 4/1996 | Kohls |
| 5,509,694 A | 4/1996 | Laurash et al. |
| 5,518,787 A | 5/1996 | Konkol |
| 5,524,934 A | 6/1996 | Schwan et al. |
| 5,547,227 A | 8/1996 | Laurash et al. |
| 5,560,657 A | 10/1996 | Morgan |
| 5,581,924 A | 12/1996 | Peterson |
| 5,586,788 A | 12/1996 | Laurash |
| 5,595,404 A | 1/1997 | Skees |
| 5,596,202 A * | 1/1997 | Arakawa ................ 250/484.4 |
| 5,598,970 A | 2/1997 | Mudry et al. |
| 5,601,222 A | 2/1997 | Haddad |
| 5,601,313 A | 2/1997 | Konkol et al. |
| 5,630,627 A | 5/1997 | Stewart |
| 5,637,369 A | 6/1997 | Stewart |
| 5,648,143 A | 7/1997 | Mehta et al. |
| 5,653,472 A | 8/1997 | Huddleston et al. |
| 5,662,976 A | 9/1997 | Popat et al. |
| 5,670,015 A | 9/1997 | Finestone et al. |
| 5,687,903 A | 11/1997 | Akridge et al. |
| 5,765,885 A | 6/1998 | Netto |
| 5,785,354 A | 7/1998 | Haas |
| 5,842,722 A | 12/1998 | Carlson |
| 5,877,742 A | 3/1999 | Klink |
| 5,933,993 A | 8/1999 | Riley |
| 5,984,363 A | 11/1999 | Dotson et al. |
| 6,000,160 A | 12/1999 | Riley |
| 6,006,460 A | 12/1999 | Blackmer |
| 6,016,618 A | 1/2000 | Attia et al. |
| 6,053,535 A | 4/2000 | Washburn et al. |
| 6,055,756 A | 5/2000 | Aoki |
| 6,058,639 A | 5/2000 | Tinklenberg et al. |
| 6,067,739 A | 5/2000 | Riley |
| 6,071,585 A | 6/2000 | Roth |
| 6,092,321 A | 7/2000 | Cheng et al. |
| 6,108,876 A | 8/2000 | Hubbert |
| 6,155,476 A | 12/2000 | Fabel |
| 6,155,603 A | 12/2000 | Fox |
| 6,159,570 A | 12/2000 | Ulrich et al. |
| 6,199,730 B1 | 3/2001 | Chisolm |
| 6,303,539 B1 | 10/2001 | Kosarew |
| 6,331,018 B1 | 12/2001 | Roth et al. |
| 6,343,819 B1 | 2/2002 | Shiozaki |
| 6,361,078 B1 | 3/2002 | Chess |
| 6,409,871 B1 | 6/2002 | Washburn et al. |
| 6,438,881 B1 | 8/2002 | Riley |
| 6,510,634 B1 | 1/2003 | Riley |
| 6,517,921 B2 | 2/2003 | Ulrich et al. |
| 6,611,962 B2 | 9/2003 | Redwood et al. |
| 6,641,048 B1 | 11/2003 | Schintz et al. |
| 6,685,228 B2 | 2/2004 | Riley |
| 6,748,687 B2 | 6/2004 | Riley |
| 6,782,648 B1 | 8/2004 | Mosher, Jr. |
| 6,807,680 B2 | 10/2004 | Sloot |
| 6,836,215 B1 | 12/2004 | Laurash et al. |
| 6,844,041 B2 | 1/2005 | Squier et al. |
| 6,863,311 B2 | 3/2005 | Riley |
| 6,981,948 B2 * | 1/2006 | Pellegrino et al. ........... 600/562 |
| 7,017,293 B2 | 3/2006 | Riley |
| 7,017,294 B2 | 3/2006 | Riley |
| 7,047,682 B2 | 5/2006 | Riley |
| 7,197,842 B2 | 4/2007 | Ali |
| 7,222,448 B2 | 5/2007 | Riley |
| 7,240,446 B2 | 7/2007 | Bekker |
| 7,286,055 B2 | 10/2007 | Girvin et al. |
| 7,523,576 B1 | 4/2009 | Riley |
| 7,763,344 B2 | 7/2010 | Riley et al. |
| 7,779,569 B2 | 8/2010 | Riley et al. |
| 7,779,570 B2 | 8/2010 | Riley |
| 7,784,209 B2 | 8/2010 | Greer |
| 7,784,210 B2 | 8/2010 | Riley et al. |
| 7,818,908 B2 | 10/2010 | Greer |
| 2002/0152928 A1 * | 10/2002 | Lawandy et al. ......... 106/31.13 |
| 2002/0176973 A1 | 11/2002 | Keiser |
| 2003/0001381 A1 | 1/2003 | Riley |
| 2003/0003249 A1 | 1/2003 | Benim et al. |
| 2003/0011190 A1 | 1/2003 | Ryan |
| 2004/0068906 A1 | 4/2004 | Riley |
| 2004/0128892 A1 | 7/2004 | Valenti |
| 2004/0244251 A1 * | 12/2004 | Riley ......................... 40/633 |
| 2005/0091896 A1 | 5/2005 | Kotik et al. |
| 2005/0108912 A1 | 5/2005 | Bekker |
| 2005/0279001 A1 | 12/2005 | Riley |
| 2005/0281989 A1 | 12/2005 | Finger |
| 2006/0230661 A1 | 10/2006 | Bekker |
| 2006/0236578 A1 | 10/2006 | Saint et al. |
| 2006/0242875 A1 | 11/2006 | Wilson et al. |
| 2006/0261958 A1 | 11/2006 | Klein |
| 2007/0089342 A1 | 4/2007 | Jain et al. |
| 2007/0120358 A1 | 5/2007 | Waggoner et al. |
| 2007/0243361 A1 | 10/2007 | Riley et al. |

| | | | |
|---|---|---|---|
| 2007/0257113 | A1 | 11/2007 | Davis et al. |
| 2008/0098636 | A1 | 5/2008 | Greer |
| 2009/0094872 | A1 | 4/2009 | Ali et al. |
| 2009/0193701 | A1 | 8/2009 | Greer |
| 2009/0277061 | A1 | 11/2009 | Jain et al. |
| 2009/0282717 | A1 | 11/2009 | Jain et al. |
| 2010/0071241 | A1 | 3/2010 | Jain et al. |
| 2010/0253060 | A1 | 10/2010 | Riley et al. |

FOREIGN PATENT DOCUMENTS

| | | |
|---|---|---|
| EP | 1039431 | 9/2000 |
| EP | 1974603 A2 | 10/2008 |
| FR | 2806594 A | 9/2001 |
| GB | 960859 | 6/1964 |
| GB | 2045718 | 11/1980 |
| GB | 2160492 | 12/1985 |
| GB | 2228915 A | 9/1990 |
| JP | 63175913 A | 11/1988 |
| JP | 5-61777 | 8/1993 |
| JP | 08-190350 | 7/1996 |
| JP | 08299035 A | 11/1996 |
| JP | 3032299 | 12/1996 |
| JP | 10-207374 | 8/1998 |
| JP | 11015383 A | 1/1999 |
| JP | 2001316921 A | 11/2001 |
| JP | 2002117190 A | 4/2002 |
| JP | 2002351321 A | 12/2002 |
| JP | 2003066849 | 3/2003 |
| JP | 2003157010 | 5/2003 |
| JP | 2003164307 | 6/2003 |
| JP | 2006039209 | 2/2006 |
| WO | 9502877 | 1/1995 |
| WO | WO 96/12618 | 5/1996 |
| WO | WO 98/23081 | 5/1998 |
| WO | WO 99/18817 | 4/1999 |
| WO | WO 02/39412 | 5/2002 |
| WO | WO 03/003331 | 1/2003 |
| WO | WO 2004/028826 | 4/2004 |
| WO | WO 2006/007356 | 6/2005 |
| WO | WO 2005/064574 | 7/2005 |
| WO | 2007/021375 | 2/2007 |
| WO | 2007/133906 | 11/2007 |
| WO | 2008/079952 A2 | 7/2008 |
| WO | 2009099787 A1 | 8/2009 |
| WO | 2009/137195 | 11/2009 |

OTHER PUBLICATIONS

Office Action for U.S. Appl. No. 11/553,891 dated Mar. 19, 2009.
International Preliminary Report on Patentability (Chapter II) for PCT/US2008/059616 dated Jul. 14, 2009.
International Search Report for PCT/US2009/039183 dated Jun. 25, 2009.
Office Action for U.S. Appl. No. 11/456,928 dated Jun. 15, 2009.
Office Action for U.S. Appl. No. 11/553,872 dated Jun. 17, 2009.
Office Action for CN Application 03825215.5 dated Jan. 8, 2010.
Office Action for U.S. Appl. No. 11/754,812 dated Feb. 9, 2010.
Office Action for EP Application 07842813.3 dated Feb. 4, 2010.
Office Action for AU Application No. 2008202215 dated Dec. 15, 2009.
Office Action for U.S. Appl. No. 11/373,923 dated Jan. 21, 2010.
Office Action for U.S. Appl. No. 11/763,615 dated Jan. 22, 2010.
International Preliminary Report on Patentability (Chapter I) for PCT/US2008/064972 dated Dec. 1, 2009.
Office Action for U.S. Appl. No. 11/405,149 dated Dec. 28, 2009.
Office Action for U.S. Appl. No. 11/456,928 dated Dec. 8, 2009.
Office Action for U.S. Appl. No. 11/735,078 dated Nov. 17, 2009.
Office Action for U.S. Appl. No. 12/509,151 dated Nov. 13, 2009.
Office Action for AU Application 2006280450 dated Sep. 14, 2009.
Office Action for CN Application 200580019868.5 dated Sep. 4, 2009.
Office Action for EP Application 03773060.3 dated Aug. 11, 2009.
Office Action for U.S. Appl. No. 12/026,030 dated Oct. 8, 2009.
Office Action for U.S. Appl. No. 12/252,710 dated Oct. 15, 2009.
Office Action for U.S. Appl. No. 11/203,601 dated Aug. 17, 2009.
Office Action for U.S. Appl. No. 11/754,812 dated Jul. 24, 2009.
Office Action for U.S. Appl. No. 11/373,923 dated Jun. 1, 2009.
Office Action for U.S. Appl. No. 11/374,273 dated May 26, 2009.
Office Action for U.S. Appl. No. 11/562,114 dated May 6, 2009.
Office Action for U.S. Appl. No. 11/735,078 dated May 28, 2009.
Office Action for U.S. Appl. No. 11/763,615 dated May 6, 2009.
Avery Dennison DuraCard™.
Avery® Laminated Identification Cards #5361.
Brochure entitled: "Color-Bar® Click Strip™ Label System"; Smead Manufacturing Company; Date Unknown; Form No. SSS-CS-00.
Brochure entitled: "Color-Bar® Folders"; Smead Manufacturing Company; Date Unknown.
Brochure entitled: "Integrated Document Management Software"; Smead Manufacturing Company; Date Unknown; Form No. SLI-95.
Catalog entitled: "Reseller Catalog Number One"; Smead Software Solutions™; Date Unknown; Form No. SSS-RC1-00.
Sample of Standard Register Labels.
Standard Register, *P.S. Magazine,* Fall 1998, Dayton, Ohio.
Gretchen Berry, "Wrist Watch," *Advance for Healthcare Information Professionals,* Feb. 15, 1999.
Sample of Standard Register Label.
"Yes, Sir, That's My Baby!," *Material Management in Health Care,* Feb. 1999, vol. 8, No. 2, Health Forum, Inc.
Disaster Management Systems, Inc., Triage Tag, Copyright 1996, Pomona, California.
Maryland Department Of Transportation, Maryland Emergency Medical Services, Triage Tag, Copyright MIEMMS 1999, Maryland.
Posey Movable I.D. Bracelet; downloaded from http:/www.posey.com/products/4648.html on Aug. 18, 2004.
Office Action for U.S. Appl. No. 11/203,601 dated Mar. 30, 2010.
Office Action for U.S. Appl. No. 11/553,891 dated Mar. 8, 2010.
Final Office Action for U.S. Appl. No. 11/735,078 dated Jul. 23, 2010.
Final Office Action for U.S. Appl. No. 12/026,030 dated Jun. 28, 2010.
Office Action for U.S. Appl. No. 11/373,923 dated Jul. 13, 2010.
Office Action for U.S. Appl. No. 12/252,710 dated Jun. 10, 2010.
Office Action for U.S. Appl. No. 12/435,541 dated Jul. 7, 2010.
Office Action for U.S. Appl. No. 11/456,928 dated Jun. 8, 2010.
International Search Report and Written Opinion for PCT/US2010/030361 dated Jul. 16, 2010.
International Preliminary Report on Patentability (Chapter II) for PCT/US2009/031979 issued May 21, 2010.
International Preliminary Report on Patentability (Chapter II) for PCT/US2009/039183 issued Apr. 20, 2010.
Office Action for AU Application 2007238028 dated Apr. 19, 2010.
Office Action for JP Application No. 2006-547497 dated Mar. 23, 2010.
Office Action for NZ Application 566071 dated May 7, 2010.
Office Action for U.S. Appl. No. 12/115,945 dated Aug. 9, 2010.
Office Action for U.S. Appl. No. 12/252,654 dated Aug. 12, 2010.
Office Action for U.S. Appl. No. 12/819,709 dated Aug. 19, 2010.
Office Action for U.S. Appl. No. 12/627,227 dated Aug. 31, 2010.
Office Action for AU Application 2006280450 dated Aug. 31, 2010.
Office Action for AU Application 2007317692 dated Aug. 12, 2010.
Office Action for CN Application 03825215.5 dated Aug. 30, 2010.
Office Action for JP Application 2007-516565 dated Jul. 13, 2010.
Office Action for U.S. Appl. No. 12/435,541 dated Oct. 29, 2010.
Office Action for EP Application 03773060.3 dated Aug. 30, 2010.
ID Warehouse (http://web.archive.org/web/20050131235601/http://idwarehouse.com/) Jan. 31, 2005. p. 1: WB1908, Stock Vinyl Wristband.

* cited by examiner

METHOD FOR MAKING AND A BUSINESS FORM HAVING PRINTED BAR CODES ON A COATED SUBSTRATE

CROSS REFERENCE AND PRIORITY CLAIM TO RELATED APPLICATION

This non-provisional application claims priority to related provisional application having Ser. No. 60/798,605, and filing date May 8, 2006.

BACKGROUND AND SUMMARY OF THE INVENTION

Bar codes are becoming ubiquitous in our society and especially for use in medical settings. This is increasingly so as there has been a general movement to more carefully monitor the identity of patients and correlate to each patient the various kinds of medications/treatments he receives and other aspects of his stay/treatment/etc. Some of this is being mandated by the passage of new laws requiring more discipline in these matters, and some of it is being adopted out of the desire to be able to more carefully ensure that each patient receives the proper care and treatment, and is billed for it appropriately. This is true in all kinds of medical environments, including in-patient care, out-patient care, emergency room care, pediatric care, nursing home care, mental health care, and virtually all other instances where accurate patient identification is needed.

One of the co-inventors herein has been active in this area, and has invented numerous inventions that have been patented as an aid in identifying patients and correlating them with the various accoutrements of their status as a patient. See for example, U.S. Pat. Nos. 5,933,993; 6,000,160; 6,067,739; 6,438,881; 6,510,634; 6,748,687; 7,017,293; 7,017,294; and 7,047,682, the disclosures of which are incorporated herein by reference. Various of these disclosures are for wristbands and associated labels of various constructions which can be conveniently prepared at the same time and individually printed with identifying indicia, such as bar codes, for rapid and simple electronic reading with a wand or scanner for inputting patient data as well as data relating to any other desired information. For example, the labels may be removed from the form and used to identify blood or other tissue samples, medical charts, and even mundane items such as utensils, etc. for patients suffering from infectious or communicable diseases.

As used herein, the term bar code is defined as any machine readable (typically through electro-optical processes) indicia, marking, symbol or a patterned or ordered arrangement of any such items which represents or contains data which is coded into the arrangement, layout, or other pattern thereof and readable at least by an electronic data entry device. Another common example of character reading other than strict bar code reading that is intended to be included by the inventors as falling within the concept of their invention is optical character reading. A bar code may also be decipherable without machine aid as well to ascertain the data contained therein, and such status does not exclude it from being considered as a bar code. A bar code may be applied to a surface through any of many means such as laser printing or the like.

Reading and obtaining a successful input of the data contained in a bar code is not a simple matter. Standards have been set for this concept of "scannability" which relates to the probability of obtaining an accurate scan at a given distance between a bar code reader and a bar code. See, for example, ANSI INCITS 182 as well as ANSI verification guideline X3.182-1990 Annex A. The greater the probability of obtaining a scan at a greater distance is indicative of a higher scannability. As bar codes are printed on wristbands, for example, and other surfaces which might not necessarily be exactly flat, and the reader may not be always aligned perfectly with the bar code or at the optimum reading angle, or the ambient light may not be ideal, and the printing of any bar code is necessarily subject to variations caused by the variations imparted by the printing process itself, an increased scannability is very important in ensuring that bar codes are accurately read, especially in a medical setting, as described above.

Still another reason that scannability is important relates to the particular environment in many health care settings. When a patient is resident in a medical facility, and it is nighttime or in any other low ambient light environment, the care givers have difficulty in reading bar coded information from a patient's wristband or otherwise at nighttime or in any other low ambient light environment. A care giver would prefer not to turn on the lights and awake the patient, or might alternatively use a flashlight, but the absence of proper lighting creates problems in scanning the bar code. First of all, the caregiver must locate the patient's wrist where the wristband is located, but also the wristband is not presented in a reliably flat orientation meaning that bar code scannability becomes more important to obtaining an accurate read. While the co-inventor's prior inventions have helped immensely by presenting these bar codes in a large, sharply laser-printed font on a bright white face sheet background, either on the wristband or the accompanying labels, the scannability of the bar code itself still introduces the possibility of an error in acquiring or scanning the data. This is further impacted by the added workload and aging population of caregivers, along with the increased complexity of the care provided, resulting in more required patient interaction and increased numbers of times that a patient's ID must be verified, both day and night. Hence, there is a real need in this environment for a bar code with improved scannability. Some prior art attempts to improve scannability may be found in U.S. Pat. Nos. 4,575,625; 5,080,456; and 5,107,100, the disclosures of which are incorporated herein by reference.

Improving contrast can help to compensate for the real world factors that tend to diminish scannability such as poor print quality on the bar code or the bar code design itself. Poor print quality results from, for example, a thermal transfer printer that has not been serviced properly, or that uses the wrong ink ribbon for the surface being printed, or is run at the wrong temperature settings-any of which may result in bar codes with gaps, thin spots where not enough ink has deposited, ragged edges, and areas where ink flows outside the area where it is supposed to be. Alternatively, bar code design factors to consider include bar codes with high density and low wide-to-narrow bar ratios which are more challenging to scan and read. These factors as well as the ordinary real world manufacturing tolerances inherent in printing a bar code onto a surface, as well as the real world inaccuracies inherent in a "read" attempt made "in the field" wherever that might be and the circumstances surrounding that "read" attempt place an increased emphasis on an improved scannability rating of a bar code under test conditions.

Others have attempted to improve scannability of a bar code through use of fluorescent or phosphorescent ink, but these prior art attempts have centered on utilizing such inks for printing of the bar codes themselves. One such effort is found in U.S. Pat. No. 6,303,929, the disclosure of which is incorporated herein by reference. Another prior art patent (U.S. Pat. No. 4,724,309) has been found that makes use of such inks as a background, but the reference teaches that the ink may be used to mark specific zones of a bank draft for example where a user may enter handwritten or typed indicia that may then be optically read in blackout conditions by passing the bank draft under ultraviolet light. The location of the area is identified by the placement of the ink, and although the reference suggests that improved readability for optical scanning is achieved, the reference teaches that bar codes may be placed on the bank draft but not in one of these zones. Furthermore, the reference teaches that such a bar code could optimally be imprinted in the very same fluorescent or phosphorescent ink, much like the '929 patent. Thus, while others have sought to improve bar code scannability through the use of these kinds of inks, the prior art has met with limited success.

The inventors are also aware of fluorescent inks being used to coat labels for other purposes, some of which may accept bar codes. For example, one such popular category of label is marketed under the Dayglo™ trademark. These labels are generally coated with a bright, even garish, color fluorescent ink such as fuscia or lime green to draw an observer's eye to it and cause it to be noticed. One popular use of such labels may be found in supermarkets where price specials are marked on these labels and they then are placed amongst the shelves for the shopper to see as they scan the shelves looking for their food items to purchase. Other labels are coated with other kinds of fluorescent ink, such as the ones generally considered to fall in the category of "invisible" ink meaning that the coating is not viewable by the naked eye except under a special light, such as an ultraviolet light. These labels also may have been imprinted with bar codes and used in the prior art.

While these labels are expected to be found in the prior art, the inventors are now not aware that anyone has determined that coating a label with fluorescing ink before imprinting a bar code on it will improve its scannability.

In attempting to solve the problem presented by trying to scan bar code imprinted wristbands, which inherently are difficult to read for the reasons given above, the inventors have for the first time determined that applying a fluorescing ink coating to an underlying substrate dramatically improves its scannability. Instead of printing the bar code itself in fluorescing ink, the method of choice as taught in the prior art for improving bar code scannability, the inventors have conceived of overcoating a patch or area of a print surface with the fluorescing ink instead and then printing the bar code directly onto it, such as with laser printing. This has been found to dramatically improve the scannability of bar codes printed onto the overcoated surface compared to an uncoated surface in virtually any level of ambient light and with virtually any bar code pattern. One key factor impacting scannability is the contrast ratio that can be obtained between the bar code and its background. The ideal has been believed to be obtained with a flat black bar code bar that adsorbs 100% of the light from the scanner printed on a bright white opaque surface that reflects 100% of the light. This ideal is impossible to achieve in the real world for reflecting light situations, for one reason that no reflective surface will reflect 100% of the light impacting it, but contrast ratios approaching 90% can be achieved. However, adding in the fluorescence feature dramatically improves the reflective light real world results and although the inventors haven't tested it scientifically, it is believed that using the present invention of fluorescent ink produces results approaching ideal. In testing, utilizing this fluorescent ink overcoat background has been found to add to this contrast ratio, as well as result in dramatically improved scannability ratings as reported below. This occurs when the fluorescent ink is energized by shorter wavelength "invisible" light in the 300 to 400 nanometer range thus emitting longer wavelength visible light in the 400 to 700 nanometer range, which can be better "seen" by the naked eye and the bar code reader by intensifying the contrast of the background to the black bar code. While not completely scientifically investigated or understood, the inventors believe it is the "fluorescing effect" of the coating that provides the dramatic improvement in scannability. Fluorescent inks do much more than merely reflect as they actually emit energy (radiation) in the form of visible light when energized by another light source (a bar code scanner) which emits a broad spectrum of light waves including UV in the 300 to 400 nanometer range needed to fluoresce the ink coating. In essence, a combination of the reflection from the white substrate plus the visible light emitting from the fluorescent ink amplifies the contrast of the black bars to the supercharged white background.

The fluorescent ink used may be any of a range of inks, such as UV curable, water based and solvent based fluorescent inks and coatings, with the important consideration being its ability to increase the intensity of light returning from the background surface over that of an uncoated surface or a surface which does not exhibit a fluorescing or similar effect. As used herein, the term "fluorescing" or "fluorescent" ink may be understood to include all such inks, including luminescent inks as well.

In an alternative embodiment, the inventors conceive of a paper stock layer made from a mix of materials such that the finished surface exhibits the reflective qualities similar to that of the layered coating of fluorescent ink of the first embodiment. In this embodiment, instead of an overcoating or layering of ink, which would require a separate additional step in manufacture, the inventors contemplate that the mixture of materials prepared in formulating the face stock during its manufacture would have added to it the appropriate materials as would be known to those of skill in the art to produce a face stock having a finished surface exhibiting the same desired fluorescing properties. The inventors are aware of brighteners, for example, that are routinely added to face stock mixtures which increase the brightness of the finished surface of the face stock, and contemplate that a similar such process could be used to achieve the purposes of the present invention. With this alternative embodiment, it is anticipated that fewer manufacturing steps would be needed.

An overview of the invention has been provided herein. Further details of the invention may be learned by referring to the drawings and description of the preferred embodiment which follow.

DETAILED DESCRIPTION OF THE PREFERRED EMBODIMENT

Figure 1:
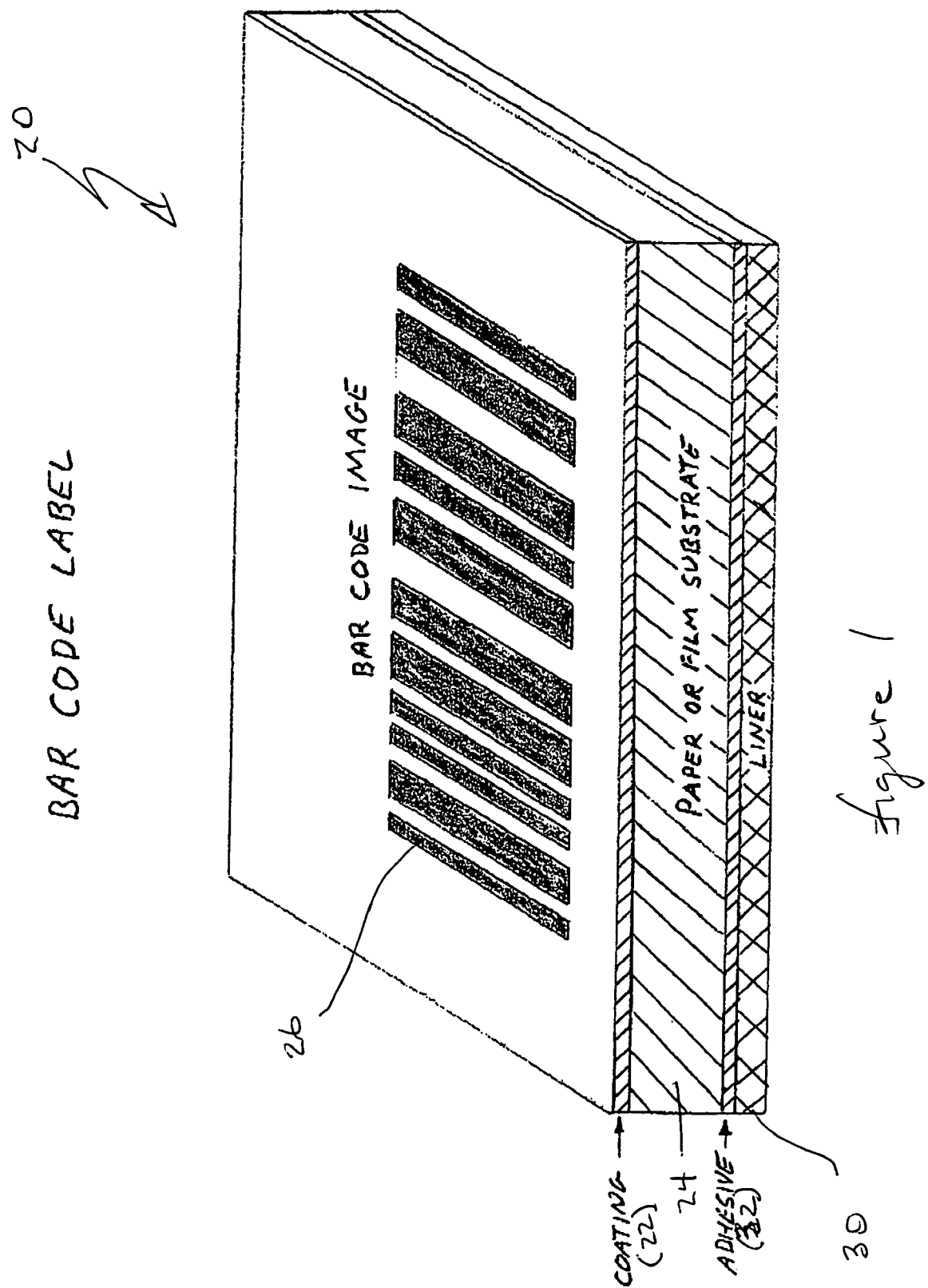
FIG. 1 is a perspective view of a label or other business form having an overprinted layer of fluorescent ink with bar code printed thereon.

As shown in the drawings, the present invention 20 involves applying a coating of fluorescent ink 22 to a carrier or face stock layer 24 of a business form and then printing a bar code 26 thereon. The face stock layer could be part of a self laminating wristband as may be die cut into the face stock layer 24 and an underlying laminate layer 30 adhered thereto with a layer of patterned adhesive 32 such that after separation of the wristband a portion of the laminate layer 30 may be folded over an imaging portion of the face stock layer 24 to protect the imaging portion. Examples of such wristband forms as well as exemplary labels may be found in any of several previously issued patents owned by the assignee hereof, as noted above. The bar code 26 is preferably printed on the face stock portion 24 so that it is protected by the overlying portion of the laminate layer 30. This wristband construction is exemplary of several such wristbands as shown in the co-inventor's prior patents. Additionally, labels (not shown) may accompany the wristband on the same page sized form and may also be printed with an identifying bar code 26. Although identified in the preferred embodiment as used with a wristband and accompanying labels, the present invention may be used with other applications as well. Anywhere a bar code (including OCR characters, as the term bar code has been defined above) may be printed onto a coated surface, the present invention is contemplated as improving the scannability of the bar code. For purposes of the present invention, a business form may also be considered as including any kind of prepared form, such as by pre-printing, and designed to accommodate, record or handle information in a commercial context whether or not the form is later printed or handwritten by a user to record additional information. Examples of documents which are business forms include shipping labels, labels of virtually any nature, inventory tags, insurance forms, financial instruments such as checks and other such forms, hang tags, ID forms, applications, admission forms, and other such similar forms that may contain a bar code for tracking or identification purposes.

The ink may be applied in a range of acceptable alternative methods, such as by flexographic, letterpress, and gravure. Spray coating methods could work as well, but are not presently considered to be as practical due to the relative minimal thickness of the preferred coating. For convenience, any method as might be used to apply such a coating with be referred to herein as "overprinting". As to thickness, the inventors believe that a nominal 0.2 mil depth or thickness is preferred. More preferably, the coating weight is desirably between about 0.2 mils up to a maximum of about 0.5 mils. The inventors have found that fluorescent coatings will achieve a good level of fluorescence at 0.2 mil thickness, will have a slight build in fluorescence up to 0.5 mils coating weight, and at over 0.5 mils fluorescence will begin to taper off. In the inventors' latest testing, gloss level was not found to play an important role in improving scannability. Both gloss and matte finish coatings were evaluated and performed equally well for the most part, with the matte finish coating showing an advantage as the distance increased. As known by those of skill in the art, depending on the type of coating chosen to be applied, whether UV, water, solvent, thermal or otherwise, the fluorescence should preferably be tested by visually observing the film under a black light. The naked eye can detect differences in fluorescence when compared to "standard" or desired specimen fluorescence. Furthermore, the print receptivity of the coating is preferably tested by for example printing test bar codes on the coated stock using thermal transfer and toner transfer coating techniques, and then preferably visually observing bar code continuity and edge definition. Ink adhesion is preferably checked by using a 3M 600 pressure sensitive adhesive testing tape, or equivalent.

The inventors have had testing performed to validate the improved contrast and scannability of a bar code, and the test results are shown on Exhibit A attached hereto. As the parameter of scannability is understood to be directly related to the contrast perceived by the character reader, as the reader typically shines a source light onto the bar code and then reads it through the light which returns to associated sensors also located in the typical reader, the present invention is thought to work by improving the perceived contrast between the bar code characters and the surrounding substrate. The letters shown are indicative of the letter grades found in the ANSI verification standard mentioned above. Briefly, the letter grade of A is best and F is worst. In the test, sixteen different sample/environment combinations were evaluated using a base stock of 4 mil white laser imprintable paper. The first variable compared the performance of paper that was either uncoated, standard fluorescence coated, or maximum fluorescence coated. The ink that was used was FT301LI UV Thermal/Laser Imprintable Topcoat for Flexographic Press, the high fluorescent version of same, and Fast Cure Matte LI. Typical properties of the inks that were used include viscosity of 270-330 cps @77 degrees F., and density of 8.90+/−0.1 pounds per gallon. The second variable compared the difference to be found in scanning the bar code either directly or with an over-lamination with a Flexicon Classics Plus 13092 1 mil semi matte polyester. The third variable compared the difference to be found in scannability in ambient light versus scanning in a shaded area or low ambient light. While the bar codes were printed digitally on an Indigo web printing unit, they were separately identified as BB (uncoated stock paper), CC (coated stock paper with fluorescent coating #1), DD (coated stock paper with fluorescent coating #2), and EE (coated paper stock with matte fluorescent coating #3) merely to track that they were applied to different surfaces.

Briefly summarized, the test results showed an improvement of one to two inches to the HHP scanner's scan range for CC and DD, with an improvement of as much three inches for EE. As the HHP Quick Check 800 has an effective scan range of 2 inches to 6 inches on a bar code with 7.6 mil narrow bar elements, the addition of 1 inch to 2 inches of extra distance represents a 17% to 33% improvement in scan range, and an even greater improvement for EE. As between two of the fluorescent coatings tested there was no discernible difference in performance while the third ink tested showed better overall performance. The conclusion drawn is that standard print receptive fluorescent coatings will provide measurable improvement in scan range. One other high fluorescent sample not reported in this test did exhibit better results than those tested and reported on herein, but the ink is considered to be prohibitively expensive for commercial application. That ink is commercially available as would be known to those of skill in the art however the inventors consider those inks disclosed herein as their preferred embodiment for achieving the purposes of the present invention. Although no difference in scannability was found based on a difference in ambient light, it is anticipated that high density bar codes will be subject to different scannability ratings in differing ambient light conditions. It is also interesting to note that the test did not indicate any scannability difference caused by over laminating the bar code. The inventors have developed, patented, and are commercializing to great success several different versions of an over laminated wristband and this test verifies that the present invention may be used to good advantage in these previously patented constructions.

Figure 2:
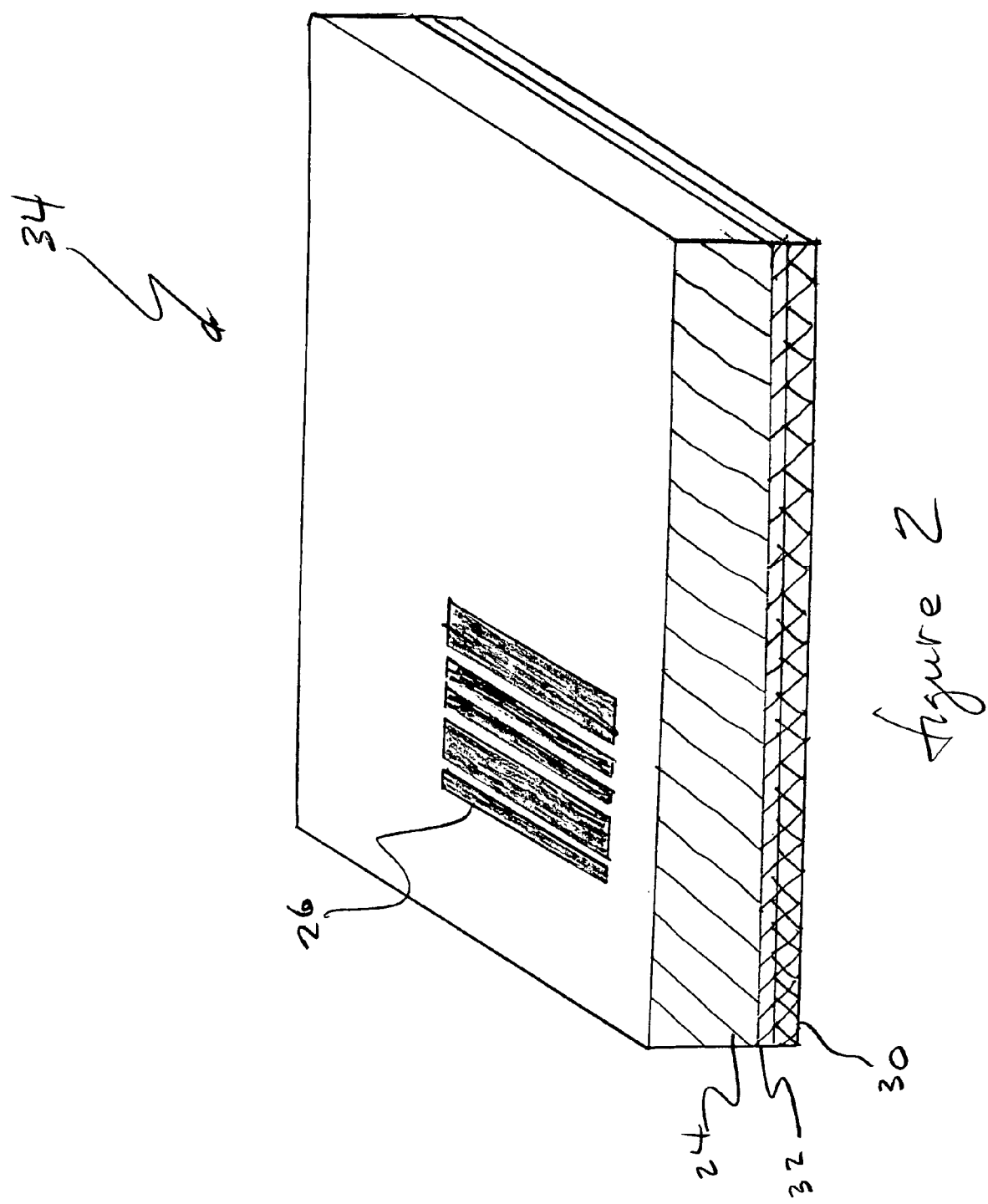
FIG. 2 is a perspective view of a label or other business form having a face stock appropriately made with materials resulting in a surface exhibiting fluorescing properties similar to that as if it had been coated with a layer of fluorescent ink.

An alternative embodiment 34 is shown in FIG. 2 and includes a face stock layer 24 that has been prepared with a mix of materials such that it exhibits the desired fluorescing effect on its finished surface as detailed above with the first embodiment. Manufacturing processes as are well known to those of skill in the art, including those as known to achieve a "brightening" of the finished face stock surface, would be readily apparent and used to achieve the finished face stock of the present invention without undue experimentation.

The present invention has been described in terms of a preferred embodiment of a wristband in the health care environment. The method and business form or other use of this enhanced scannability bar code could be readily used in other applications and environments. Variations of the invention are contemplated by the inventors. In a broad sense, the inventors consider their invention to encompass preparing a paper stock, face stock or other print surface that is print receptive and containing a fluorescent whitening agent for greater brightness. The fluorescent coating could be applied by a number of printing methods including flexographic, letterpress, and gravure, for example, and possibly by other methods of deposition such as spraying. Because a light coat weight is desired, spray coating is not considered a practical option given the present state of the art in spray coating as known to the inventors although that could very well change with improvements in such techniques. An alternative, not tested by the inventors, would be to use a titanium dioxide coating. Titanium dioxide is one of the most opaque and bright white pigments available in today's market. It is contemplated that it would add opacity and possibly brightness. Possible inks to be used to print the bar code include cool colors (blues and greens), and the organic blacks. Other changes and modifications would be apparent to one of ordinary skill in the art upon reading the present disclosure, and those changes and modifications are considered as part of the present invention which should be limited solely by the scope of the appended claims and their legal equivalents.

What is claimed is:

1. A method for creating a bar code on a print surface having an improved scannability under ambient light, the method comprising:
   overprinting at least a portion of a print surface with a colorless fluorescent ink, and
   printing with an opaque ink the bar code onto the fluorescent overprint portion of said print surface.

2. The method of claim 1 wherein the step of overprinting includes creating a substantially uniformly covered patch of said surface with a fluorescent ink with a coating of between about 0.2 mils and about 0.5 mils in thickness.

3. The method of claim 1 wherein the step of overprinting includes overprinting with a fluorescent ink having a thickness of about 0.2 mils.

4. The method of claim 1 wherein the step of overprinting includes overprinting with a fluorescent ink having a fluorescence of a range exhibiting improved scannability.

5. The method of claim 1 wherein the step of overprinting includes overprinting with a fluorescent ink having a coating between about 0.2 mils and about 0.5 mils, a print receptivity having a range acceptable for bar codes, and a fluorescence having a range acceptable for improving bar code scannability.

6. The method of claim 1 further comprising the step of overlaminating with a layer of clear laminate at least the bar code printed on the overprinted portion of said print surface.

7. The method of claim 1 wherein said print surface comprises a sheet of paper stock, and the step of overprinting comprises overprinting substantially the entirety of said sheet.

8. The method of claim 1 further comprising the step of die cutting an imaging area for a wristband into said sheet, and wherein the step of printing the bar code includes printing it on said imaging area.

9. The method of claim 8 further comprising the step of providing a backing of clear laminate to said sheet, die cutting a lamination layer into said laminate, and arranging the lamination layer die cut so that upon separation of said wristband and lamination layer from said sheet the lamination layer is positioned to overlaminate at least said imaging area of said wristband.

10. A business form having an enhanced scannability bar code in ambient light comprising a print surface, an overprint layer of colorless fluorescent ink covering substantially the entirety of a bar code receiving surface, and a bar code comprised of opaque ink applied to said bar code receiving surface.

11. The business form of claim 10 wherein said overprint layer of fluorescent ink comprises a layer of between about 0.2 mils and 0.5 mils.

12. The business form of claim 10 wherein said overprint layer of fluorescent ink is comprised of an ink having a print receptivity of a range suitable for printing bar codes thereon.

13. The business form of claim 10 wherein said overprint layer of fluorescent ink comprises an ink having a fluorescence of a range exhibiting improved scannability.

14. The business form of claim 10 wherein said overprint layer of fluorescent ink comprises a layer of between about 0.2 and 0.5 mils of fluorescent ink having a print receptivity of a range suitable for printing bar codes thereon and a fluorescence of a range exhibiting improved scannability.

15. The business form of claim 10 wherein said print surface comprises a face stock, and wherein said overprint layer covers substantially the entirety of the face stock.

16. The business form of claim 15 further comprising a die cut in said face stock defining an imaging area for a wristband, the bar code receiving surface being part of the imaging area.

17. The business form of claim 16 further comprising a laminate backing to said face stock, and a die cut in said laminate backing to define a laminate layer which, when the wristband and laminate layer are separated from the face stock, may be folded to overlaminate the imaging area.

18. A business form comprising a face ply and a laminate backing ply with a layer of patterned adhesive separating said face ply and said laminate backing ply, a wristband die cut into said business form, said wristband including a print surface formed in said face ply and an overlaminating portion formed in said laminate backing ply, and a layer of colorless fluorescent ink overprinted onto at least the print surface of said wristband so that a bar code printed in opaque ink onto said print surface exhibits an enhanced scannability in an ambient light environment.

19. The business form of claim 18 wherein said ink is overprinted to a thickness of between about 0.2 mils and 0.5 mils.

20. The business form of claim 19 wherein substantially the entirety of said face stock is overprinted.

21. A business form comprising a face ply layer and a laminate backing layer with a layer of patterned adhesive separating said face ply and said laminate ply, a self laminating wristband die cut into said business form, said wristband including a print surface die cut into said face ply and a laminating portion die cut into said laminate ply, said laminating portion being arranged to overlaminate the print surface after separation of the wristband from the form, and a layer of colorless fluorescent ink overprinted onto at least the print surface of said wristband so that a bar code printed in opaque ink onto said print surface exhibits an enhanced scannability under ambient light.

22. The business form of claim 21 wherein said ink is overprinted to a thickness between about 0.2 mils and about 0.5 mils.

23. A business form having a bar code with increased scannability under ambient light comprising a face stock having a print surface wherein the face stock is manufactured to exhibit colorless fluorescence over an upper surface, and a bar code applied in opaque ink to said upper surface.

24. A business form having an enhanced scannability bar code in ambient light comprising a page, a print surface forming a top surface of said page, an overprint layer of colorless fluorescent ink covering substantially the entirety of a bar code receiving surface, and a bar code comprised of opaque ink applied to said bar code receiving surface, and a die cut in at least said print surface defining at least one label, said at least one label having said bar code receiving surface.

25. The business form of claim 24 wherein said die cut defines a plurality of labels and further comprising at least one bar code applied to at least one of said labels.

26. A business form adapted for exhibiting an enhanced scannability bar code in ambient light comprising a print surface, and an overprint layer of colorless fluorescent ink covering substantially the entirety of a bar code receiving surface contained within said print surface, said print surface being adapted to receive a bar code comprised of opaque ink applied to said bar code receiving surface.

27. A business form adapted for exhibiting an enhanced scannability bar code in ambient light comprising a page, a print surface forming a top surface of said page, an overprint layer of colorless fluorescent ink covering substantially the entirety of a bar code receiving surface contained within said print surface, said print surface being adapted to receive a bar code comprised of opaque ink applied to said bar code receiving surface, and a die cut in at least said print surface defining at least one label, said at least one label each having a bar code receiving surface.

28. The business form of claim 27 wherein said die cut defines a plurality of labels and further comprising at least one bar code applied to at least one of said labels.

* * * * *